(12) United States Patent
Asada et al.

(10) Patent No.: US 11,000,944 B2
(45) Date of Patent: May 11, 2021

(54) FOOT TOUCH POSITION FOLLOWING APPARATUS, METHOD OF CONTROLLING MOVEMENT THEREOF, AND NON-TRANSITORY COMPUTER-READABLE INFORMATION RECORDING MEDIUM STORING THE SAME

(71) Applicants: Haruhiko Harry Asada, Lincoln, MA (US); Kosuke Takeuchi, Cambridge, MA (US)

(72) Inventors: Haruhiko Harry Asada, Lincoln, MA (US); Kosuke Takeuchi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 335 days.

(21) Appl. No.: 15/567,676

(22) PCT Filed: Apr. 15, 2016

(86) PCT No.: PCT/US2016/027718
§ 371 (c)(1),
(2) Date: Oct. 19, 2017

(87) PCT Pub. No.: WO2016/172002
PCT Pub. Date: Oct. 27, 2016

(65) Prior Publication Data
US 2018/0111261 A1    Apr. 26, 2018

Related U.S. Application Data

(60) Provisional application No. 62/151,051, filed on Apr. 22, 2015.

(51) Int. Cl.
*B25J 9/16*    (2006.01)
*B25J 3/04*    (2006.01)
(Continued)

(52) U.S. Cl.
CPC ............... *B25J 3/04* (2013.01); *B25J 9/0006* (2013.01); *B25J 9/1697* (2013.01); *B25J 13/04* (2013.01);
(Continued)

(58) Field of Classification Search
USPC .......................... 700/245–264; 901/1, 46, 47
See application file for complete search history.

(56) References Cited

U.S. PATENT DOCUMENTS 5,744,953 A * 4/1998 Hansen ................ A61B 5/1036
324/207.17
5,826,578 A * 10/1998 Curchod .............. A61B 5/1121
600/595
(Continued)

FOREIGN PATENT DOCUMENTS

JP    2006-185438    7/2006
JP    2008-210238    9/2008

OTHER PUBLICATIONS

Masafumi Hashimoto, Fuminori Oba, Yasushi Fujikawa, Kazutoshi Imamaki and Tetsuo Nishida, "Position Estimation Method for Wheeled Mobile Robot by Integrating Laser Navigation and Dead Reckoning Systems", JRSJ vol. 11, No. 7, pp. 1028-1038, 1993, with English abstract.
(Continued)

*Primary Examiner* — Jonathan L Sample
(74) *Attorney, Agent, or Firm* — IPUSA, PLLC

(57) ABSTRACT

A foot touch position following apparatus includes a foot touch position detection part configured to detect a position where a human foot touches a surface; and a moving part configured to move the foot touch position following apparatus based on the detected result of the foot touch position detection part.

19 Claims, 10 Drawing Sheets

(51) Int. Cl.
    *B62D 57/032* (2006.01)
    *B25J 9/00* (2006.01)
    *B25J 13/04* (2006.01)

(52) U.S. Cl.
    CPC .......... *B62D 57/032* (2013.01); *Y10S 901/09* (2013.01); *Y10S 901/47* (2013.01)

(56) References Cited

U.S. PATENT DOCUMENTS

| | | | | |
|---|---|---|---|---|
| 7,211,980 B1* | 5/2007 | Bruemmer | ........... | G05D 1/0246 318/567 |
| 7,778,726 B2* | 8/2010 | Miyake | ................ | G05B 13/02 700/210 |
| 9,499,218 B1* | 11/2016 | Stephens | ............. | G05D 1/0891 |
| 10,383,552 B2* | 8/2019 | Martinson | ........... | A61B 5/0077 |
| 2006/0064203 A1* | 3/2006 | Goto | ........................ | G05D 1/12 700/245 |
| 2006/0111814 A1* | 5/2006 | Hachitani | .............. | G05D 1/027 700/258 |
| 2007/0003915 A1* | 1/2007 | Templeman | ............ | G06F 3/011 434/247 |
| 2007/0054777 A1* | 3/2007 | Kawai | .................... | A63B 23/04 482/1 |
| 2007/0084278 A1* | 4/2007 | Kawal | ................ | A61B 5/1121 73/172 |
| 2008/0215184 A1* | 9/2008 | Choi | ................. | G06K 9/00664 700/259 |
| 2008/0249740 A1* | 10/2008 | Verhaert | ................ | G01C 21/16 702/160 |
| 2009/0055019 A1* | 2/2009 | Stiehl | .................... | B25J 9/1656 700/249 |
| 2009/0234499 A1* | 9/2009 | Nielsen | ................ | B25J 9/1666 700/250 |
| 2009/0312867 A1* | 12/2009 | Hasegawa | ............ | B62D 57/032 700/245 |
| 2010/0035688 A1* | 2/2010 | Picunko | ................ | A63F 13/10 463/39 |
| 2010/0222925 A1* | 9/2010 | Anezaki | ............... | G05D 1/0253 700/253 |
| 2010/0250001 A1* | 9/2010 | Hodgins | ................ | G05B 11/32 700/261 |
| 2012/0143374 A1* | 6/2012 | Mistry | ................ | B62D 57/032 700/259 |
| 2012/0184878 A1* | 7/2012 | Najafi | .................... | A61B 5/112 600/592 |
| 2012/0197439 A1* | 8/2012 | Wang | .................... | G05D 1/0038 700/259 |
| 2012/0316680 A1* | 12/2012 | Olivier, III | ........... | G05D 1/0246 700/258 |
| 2013/0211587 A1* | 8/2013 | Stephens, Jr. | .......... | B25J 9/1689 700/246 |
| 2013/0211594 A1* | 8/2013 | Stephens, Jr. | .......... | G06N 3/008 700/259 |
| 2013/0226048 A1* | 8/2013 | Unluhisarcikli | ......... | A61H 1/00 601/34 |
| 2014/0221894 A1* | 8/2014 | Nagasaka | ................ | A61H 3/00 602/23 |
| 2015/0051734 A1* | 2/2015 | Zheng | .................... | B25J 9/1633 700/261 |
| 2015/0120044 A1* | 4/2015 | Cory | .................... | B62D 57/032 700/250 |
| 2015/0197008 A1* | 7/2015 | Yoon | ...................... | B25J 9/0006 700/250 |
| 2016/0184985 A1* | 6/2016 | Shim | ...................... | B25J 9/1671 623/32 |

OTHER PUBLICATIONS

Ryo Kurazume, Akira Motomura, Yuuki Yamaguchi, Takeshi Matsuoka, Motoji Yamamoto and Tsutomu Hasegawa, "Robust Positioning Method using Omni-directional Camera and Dead Reckoning for Soccer Robots", JRSJ vol. 22, No. 3, pp. 343-352, 2004, with English abstract.

Mindminus. How to make an object following robot—the stalkerbot. Jul. 25, 2014 (Jul. 25, 2014). [retrieved on Jun. 16, 20161. Retrieved from the 1nternet:cURL:http:llw.instructables.com/id/How-to-make-an-object-following-robot-the-stalkerb/>. entire document.

International Search Report for PCT/US2016/027718 dated Jul. 15, 2016.

* cited by examiner

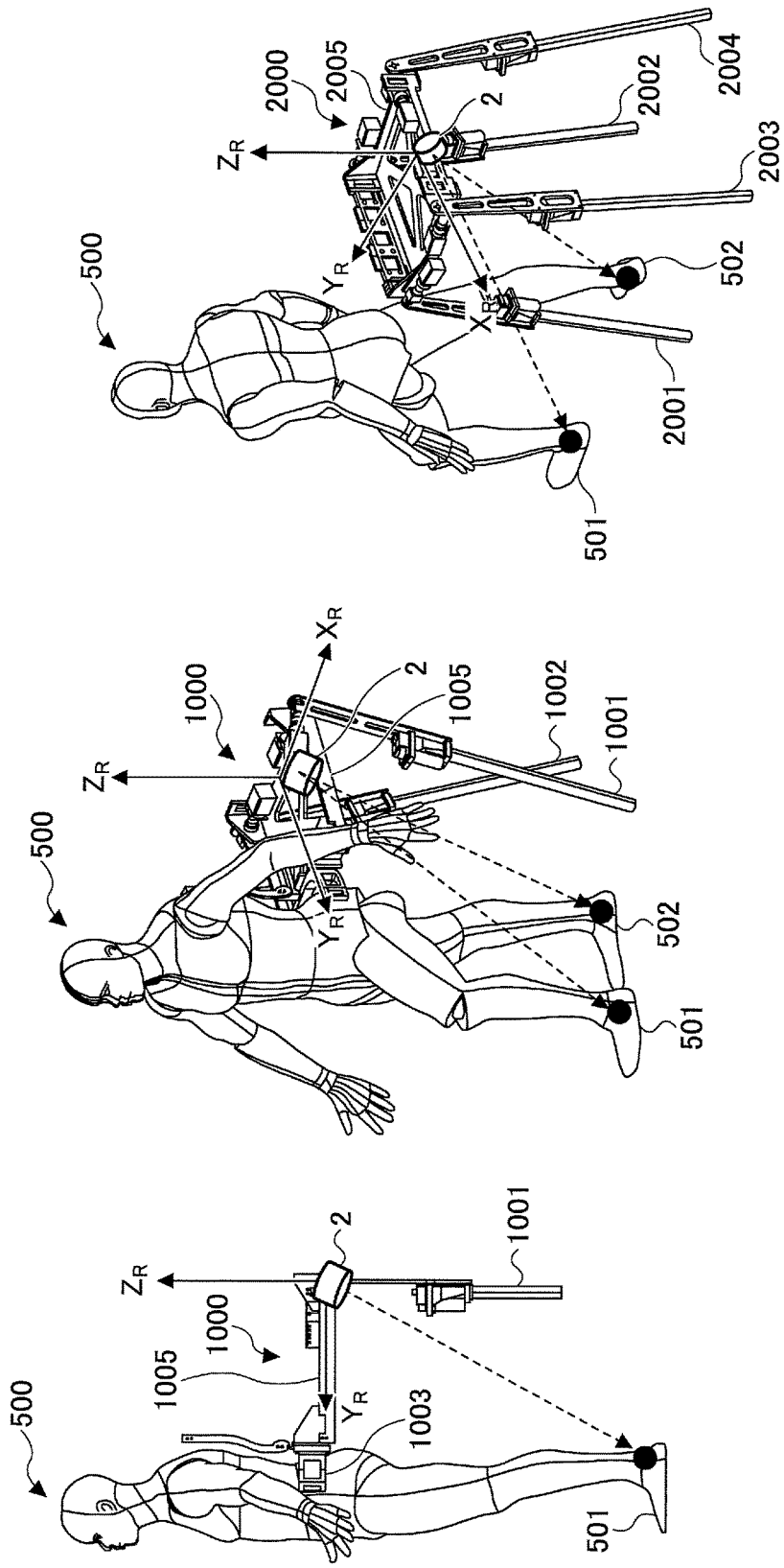

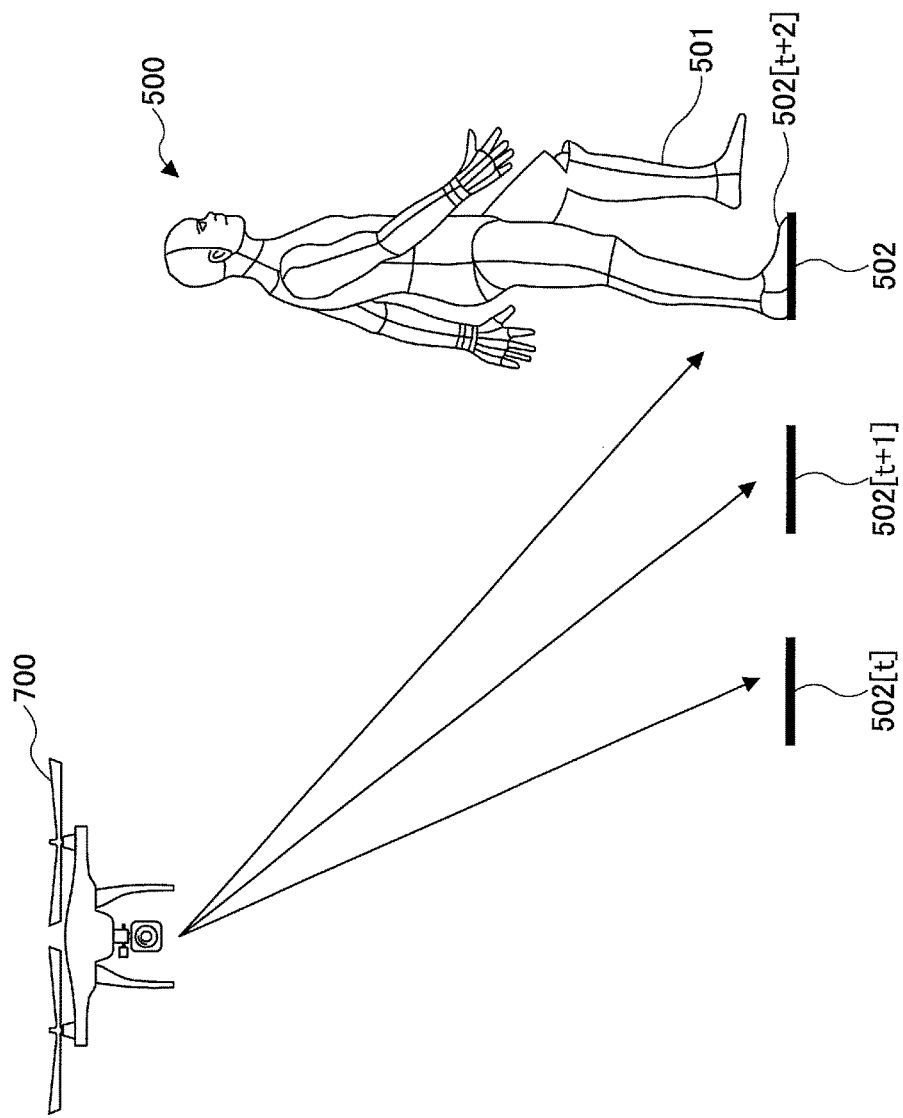

FOOT TOUCH POSITION FOLLOWING APPARATUS, METHOD OF CONTROLLING MOVEMENT THEREOF, AND NON-TRANSITORY COMPUTER-READABLE INFORMATION RECORDING MEDIUM STORING THE SAME

TECHNICAL FIELD

The present invention relates to a foot touch position following apparatus, a method of controlling a movement thereof, a computer-executable program, and a non-transitory computer-readable information recording medium storing the same.

BACKGROUND ART

Patent Literature PTL 1 discloses a robot control apparatus that detects a human in front of a robot, and acquires path teaching data while the robot is moving in association with the movement of the human. The path teaching data is then used for the robot to move autonomously.

CITATION LIST

Patent Literature

[PTL 1] Japanese Laid-Open Patent Publication No. 2006-185438

SUMMARY OF INVENTION

Technical Problem

An object is to enable the safe movement of a device on a surface with a simple control scheme.

Solution to Problem

A foot touch position following apparatus according to one aspect includes a foot touch position detection part configured to detect a position where a human foot touches a surface; and a moving part configured to move the foot touch position following apparatus based on a detected result of the foot touch position detection part.

BRIEF DESCRIPTION OF DRAWINGS

FIG. 9 illustrates one example of a method of detecting foot touch positions according to the first embodiment of the present invention.

FIG. 10 illustrates one example of the method of detecting foot touch positions according to the first embodiment of the present invention.

FIG. 11 illustrates one example of a method of detecting foot touch positions according to the second embodiment of the present invention.

FIG. 14 illustrates one example of a method of detecting foot touch positions.

DESCRIPTION OF EMBODIMENTS

As will be described later in detail, embodiments of the present invention allow a foot touch position following apparatus to reliably follow a human, despite irregularity of a floor, a staircase, or any other rough ground. A foot touch position following apparatus may be attached to or worn by a human, having multiple legs for supporting its own weight and, for example, carrying a load. In another configuration, a foot touch position following apparatus can be separate from a human, and can stand by itself on multiple legs.

The foot touch position following apparatus can be equipped with a vision sensor, a light detection and ranging (lidar), or another form of a sensor (for example, a camera), for detecting positions where the feet of a human touch a surface such as the ground, when walking across a floor, climbing a staircase, moving through a scaffold, another dangerous place, or the like.

In traditional autonomous mobile robots and humanoids, steps of the robot are determined by considering local conditions of floors/grounds. If the robot steps at an edge of a staircase, for example, it may fail to maintain the body balance, resulting in falling or collapsing.

A key idea of the embodiments of the present invention is to detect positions where the feet of a human touch a surface (hereinafter, simply referred to as "foot touch positions") with a camera or another sensor mounted on a base of a foot touch position following apparatus, and place legs or wheels at exactly the same positions as the foot touch positions or other positions determined therefrom.

The human can select the correct location for placing his/her foot, which is safe for the foot to be placed. According to the embodiments of the present invention, a foot touch position following apparatus exploits the human's ability to select the right locations for placing his/her feet, and traces the foot touch positions to move across even a dangerous place by simply placing the legs or wheels at the same positions as the foot touch positions or other positions determined therefrom. No complex reasoning and decision making are needed. Simply following exactly the foot touch positions, a foot touch position following apparatus can safely follow a human or can safely trace a route through which a human has passed.

In general, a surface such as the ground or a floor where a robot operates is not necessarily plain. The conditions are various, for example, irregular grounds, side ditches on streets, slippery floors where oil is spilled in factories, or the like.

Figure 5:
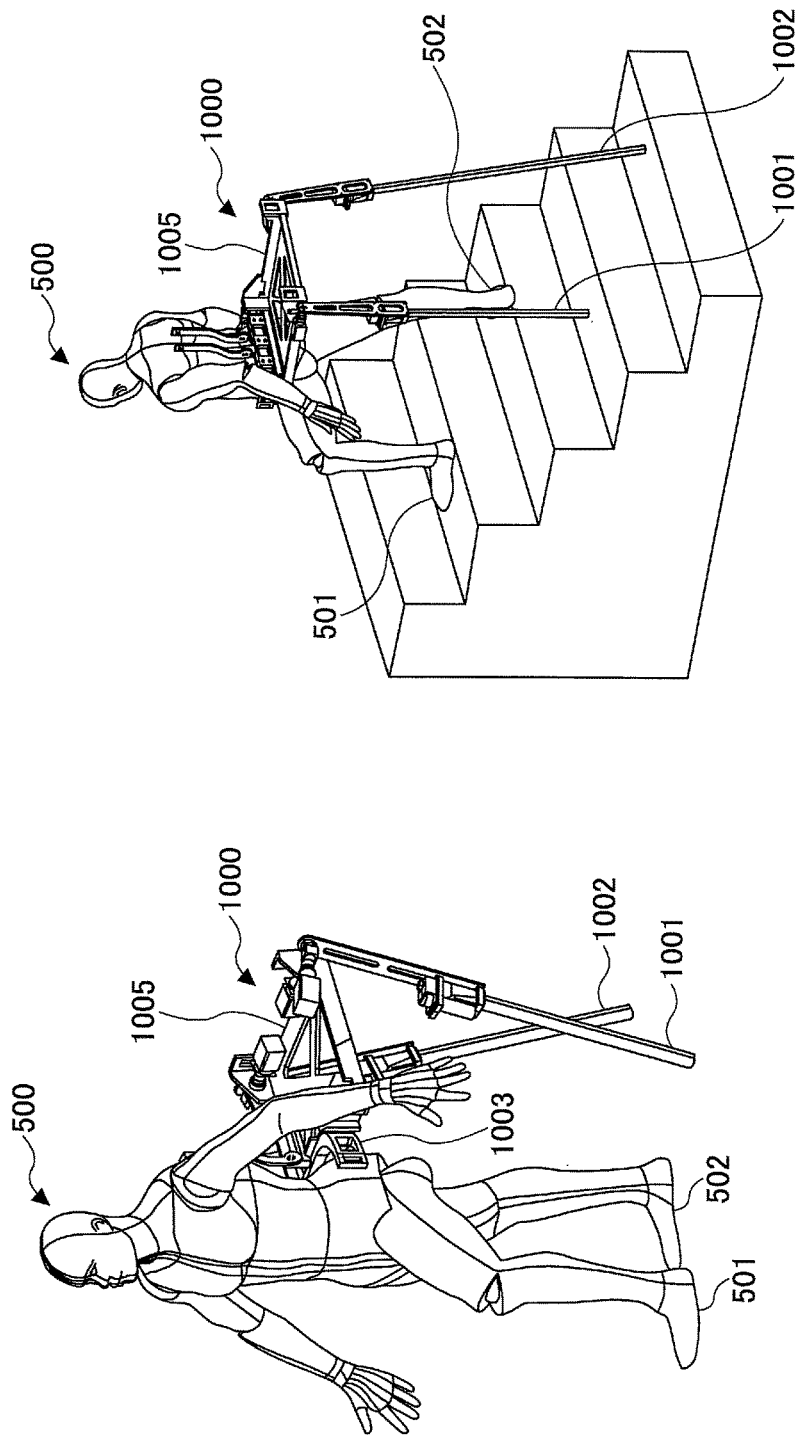
FIG. 5A is a perspective view illustrating one example of a foot touch position following apparatus according to a first embodiment of the present invention.
FIG. 5B is a perspective view illustrating the example of the foot touch position following apparatus according to the first embodiment of the present invention.

Therefore, it is advantageous for a foot touch position following apparatus to previously acquire information concerning positions or areas which are guaranteed to be safe on a surface such as the ground or a floor where the foot touch position following apparatus operates, in particular, in a case where the foot touch position following apparatus has so-called supernumerary robotic limbs (SRLs) which are connected to a human who uses them (see FIGS. 5A and 5B, which will be described later).

According to the embodiments of the present invention, it is possible to define positions or areas which are guaranteed to put SRLs, or the like, safely on a surface. The positions or areas correspond to the above-mentioned foot touch positions. Because the human chooses and steps safe positions or areas on a surface in walking, the embodiments of the present invention use these human characteristics to control the SRLs, or the like, so as to be able to move the foot touch position following apparatuses safely.

The control method of the embodiments of the present invention is quite simple. Foot touch positions are detected and calculated with a camera 2 attached on a base 1005/2005/3005, and then, the SRLs 1001 and 1002, or the like, follow the foot touch positions. For example, the distance between human's feet 501 and 502 and the tips of the SRLs 1001 and 1002 can be, for example, a one-step length at a minimum and a two-step length at a maximum. In this way, the SRLs 1001 and 1002 can be controlled simply and safely.

With reference to FIGS. 1-14, the embodiments of the present invention will be described in more details.

Figure 1:
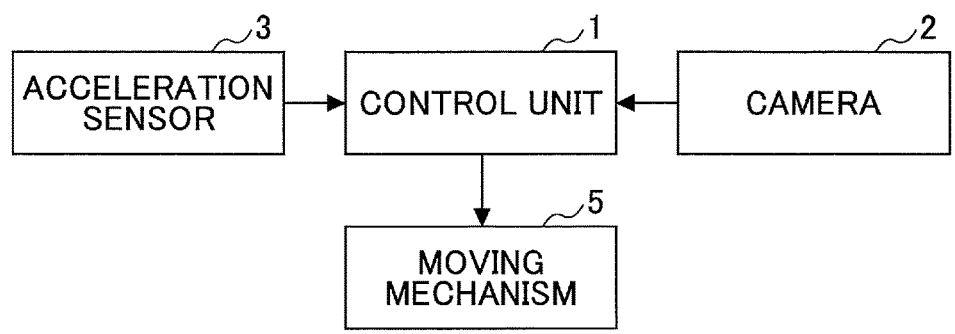
FIG. 1 is a hardware block diagram illustrating one example of a hardware configuration of a foot touch position following apparatus according to embodiments of the present invention.

FIG. 1 is a hardware block diagram illustrating one example of a hardware configuration of a foot touch position following apparatus 1000/2000/3000 according to embodiments of the present invention.

As shown in FIG. 1, the foot touch position following apparatus according to any one of first, second and third embodiments of the present invention includes a control unit 1, a camera 2, an accelerator sensor 3, and a moving mechanism 4.

Figure 7:
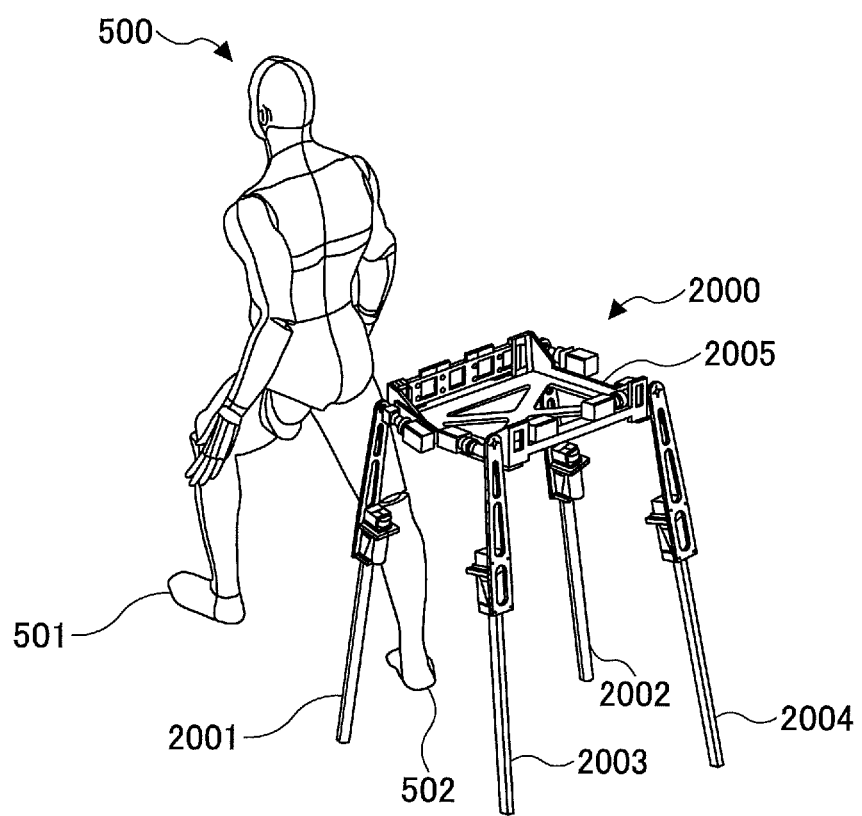
FIG. 7 is a perspective view illustrating one example of a foot touch position following apparatus according to a second embodiment of the present invention.
Figure 13:
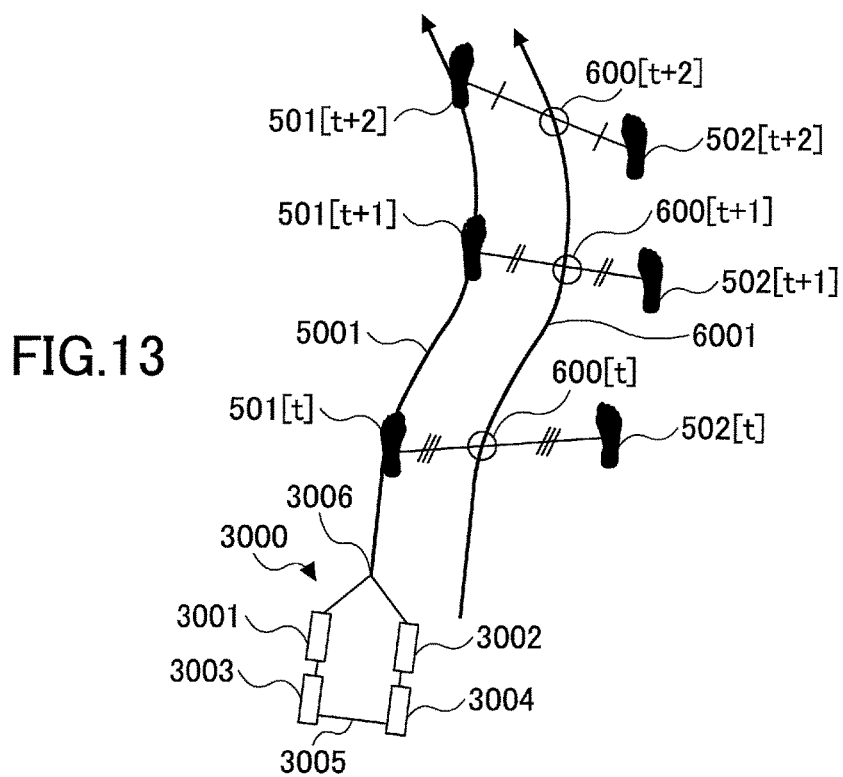
FIG. 13 illustrates one example of a manner of controlling a route of a foot touch position following apparatus in association with foot touch positions according to a third embodiment of the present invention.

The moving mechanism 4 includes the above-mentioned SRLs 1001 and 1002 shown in FIGS. 5A and 5B in the first embodiment of the present invention, four legs 2001-2004 shown in FIG. 7 in a second embodiment of the present invention, wheels 3001-3004 shown in FIG. 13 in a third embodiment of the present invention, or the like.

The moving mechanism 4 also includes actuators to actually drive the above-mentioned SRLs, four legs, wheels, or the like. Specific examples of the actuators include those using electric motors, hydraulic pressures, atmospheric pressures, and so forth.

The control unit 1 controls the actuators of the moving mechanism 4 to control actual movements of the SRLs, the four legs, the wheels, or the like. Actually, as will be described later, the control unit 1 calculates control steps for controlling the actuators to drive the SRLs, the four legs, the wheels, or the like, to finally reach foot touch positions or other positions determined based thereon. The control unit 1 then generates control signals to actually control the respective actuators so as to determine the actual movements of the SRLs, the four legs, the wheels, or the like.

The camera 2 is mounted on a base 1005/2005/3005 of the foot position following apparatus 1000/2000/3000, and captures images of human legs, and outputs the corresponding image data to the control unit 1 for detecting foot touch positions. For this purpose, the camera 2 can be a stereo camera, for example. The camera 2 can be replaced by another sensor such as a lidar, or the like, as mentioned above.

Also the acceleration sensor 3 is mounted on the base 1005/2005/3005 of the foot position following apparatus 1000/2000/3000, and detects the acceleration of the base 1005/2005/3005.

For example, the control unit 1 first detects the foot touch positions with respect to the position of the camera 2. However, the camera 2 (or the base 1005/2005/3005) itself may move along with a movement of the foot position following apparatus 1000/2000/3000 while the SRLs, the four legs, the wheels, or the like, are operated to reach the foot touch positions or other positions determined based thereon according to the control steps that were calculated based on the position of the camera 2 when the foot touch positions were first detected. In order to cause the SRLs, the four legs, the wheels, or the like, to precisely reach the first detected foot touch positions or other positions determined based thereon, the movement of the camera 2, if any, along with the operations of the SRLs, the four legs, the wheels, or the like, from when the foot touch positions were detected first, is considered. For this purpose, the acceleration sensor 3 detects the acceleration of the base 1005/2005/3005 of the foot position following apparatus 1000/2000/3000 for the control unit 1 to calculate the movement of the base 1005/2005/3005 of the foot position following apparatus 1000/2000/3000 and acquire relative foot touch positions (which will be described later).

The acceleration sensor 3 can be of any type, such as a mechanical accelerometer, a semiconductor accelerometer, or the like.

Figure 2:
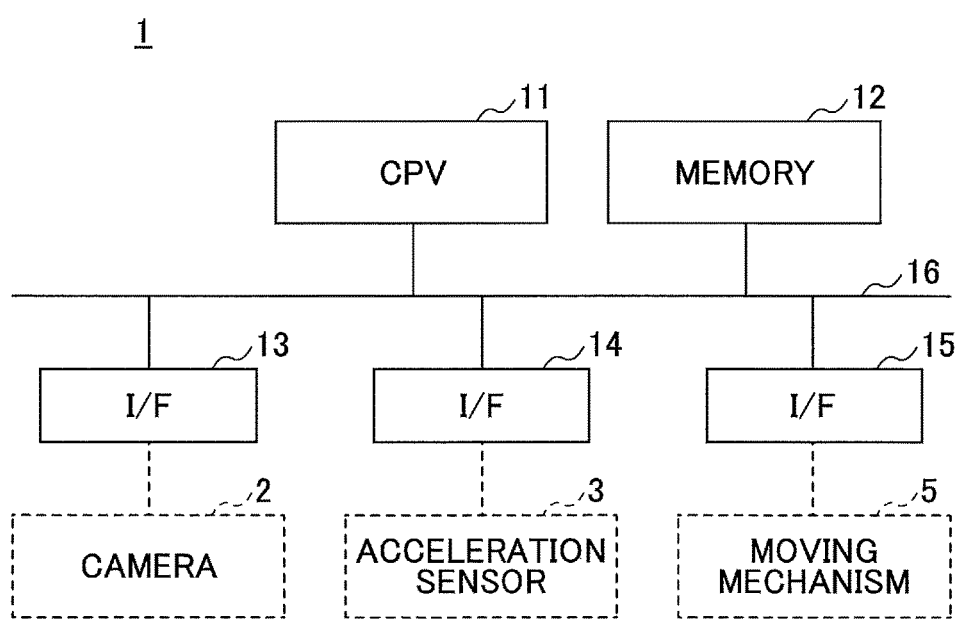
FIG. 2 is a hardware block diagram illustrating one example of a hardware configuration of a control unit shown in FIG. 1.

FIG. 2 is a hardware block diagram illustrating one example of a hardware configuration of the control unit 1.

As shown in FIG. 2, the control unit 1 includes a Central Processing Unit (CPU) 11, a memory 12, an interface 13 for the camera 2, an interface 14 for the acceleration sensor 3, and an interface for the moving mechanism 5. The respective units are mutually connected by a bus 16.

The CPU 11 calculates the control steps based on the foot touch positions or the relative foot touch positions, and generates the control signals to drive the actuators of the moving mechanism 5.

The memory 12 includes, for example, a Read-Only Memory (ROM), a Random Access Memory (RAM), and so forth, and stores various programs and data for the CPU 11 to calculate the control steps and generate the control signals.

The interfaces 13, 14 and 15 are inserted between the control unit 1 and the other hardware devices such as the camera 2, the acceleration sensor 3 and the moving mechanism 5 for properly transmitting/receiving signals therebetween by appropriately converting the signals, if necessary, for example.

Figure 3:
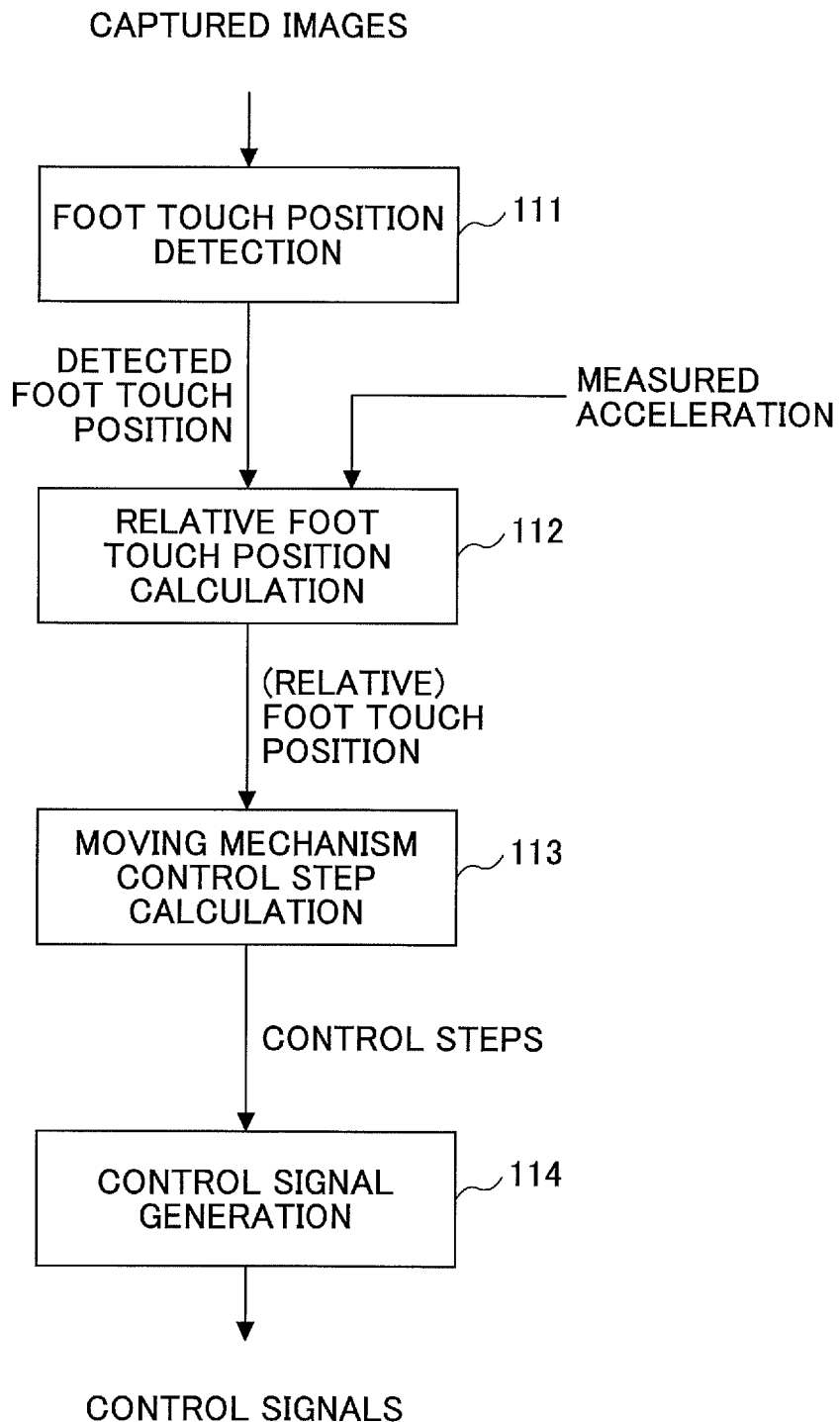
FIG. 3 is a functional block diagram illustrating one example of a functional configuration of the foot touch position following apparatus shown in FIG. 1.

FIG. 3 is a functional block diagram illustrating one example of a functional configuration of the control unit 1.

Actually, the functions that will be described with reference to FIG. 3 can be implemented as a result of the CPU 11 executing the corresponding programs stored in the memory 12.

The control unit 1 has a foot touch position detection part 111, a relative foot touch position calculation part 112, a moving mechanism control step calculation part 113, and a control signal generation part 114.

The foot touch position detection part 111 receives images captured by the camera 2, and detects the foot touch positions through image processing carried out on the captured images.

For example, the foot touch position detection part 111 calculates the positions of the feet 501 and 502 of a target human 500 with respect to the position of the camera 2 (i.e., the base 1005/2005/3005) as the foot touch positions. The foot touch position detection part 111 can use a three-dimensional coordinate system having the origin of the coordinate axes $X_R$, $Y_R$ and $Z_R$ as the position of the camera 2 (i.e., the base 1005/2005/3005), as shown in FIGS. 9-11.

In order to actually detect the positions of the feet 501 and 502 of the target human 500, the foot touch position detection part 111 can use previously acquired data concerning the shapes of (the heels of) the feet of the human 500, for example. Alternatively, markers can be previously attached to (the heels of) the feet 501 and 502 of the target human 500 such that the foot touch position detection part 111 can detect the positions of (the heels of) the feet 501 and 502 of the target human 500 easily. The markers can be those having characteristic patterns drawn thereon, having light emission devices such as Light Emission Diodes (LED) thereon, or the like.

The moving mechanism control step calculation part 113 calculates the control steps first based on the foot touch positions detected by the foot touch position detection part 111.

The relative foot touch position calculation part 112 calculates the relative foot touch positions based on the foot touch positions detected by the foot touch position detection part 111 and the movement of the base 1005/2005/3005 calculated based on the acceleration of the base 1005/2005/3005 measured by the acceleration sensor 3. The relative foot touch positions are relative foot touch positions with respect to the current position of the base 1005/2005/3005. When the base 1005/2005/3005 has moved after the foot touch position detection part 111 detected the foot touch positions first, the relative foot touch positions with respect to the base 1005/2005/3005 have shifted accordingly. In fact, after the base 1005/2005/3005 has moved forward, the once detected foot touch positions relatively approach the base 1005/2005/3005 accordingly. The relative foot touch position calculation part 112 calculates the relative foot touch positions every control period except the first control period.

The moving mechanism control step calculation part 113 again calculates the control steps based on the relative foot touch positions currently calculated by the relative foot touch position calculation part 112. The moving mechanism control step calculation part 113 calculates the control steps every control period based on the relative foot touch positions calculated in the corresponding control period by the relative foot touch position calculation part 112.

The control signal generation part 114 generates the control signals to actually control the actuators of the moving mechanism 5 based on the control steps generated by the moving mechanism control step calculation part 113.

Figure 4:
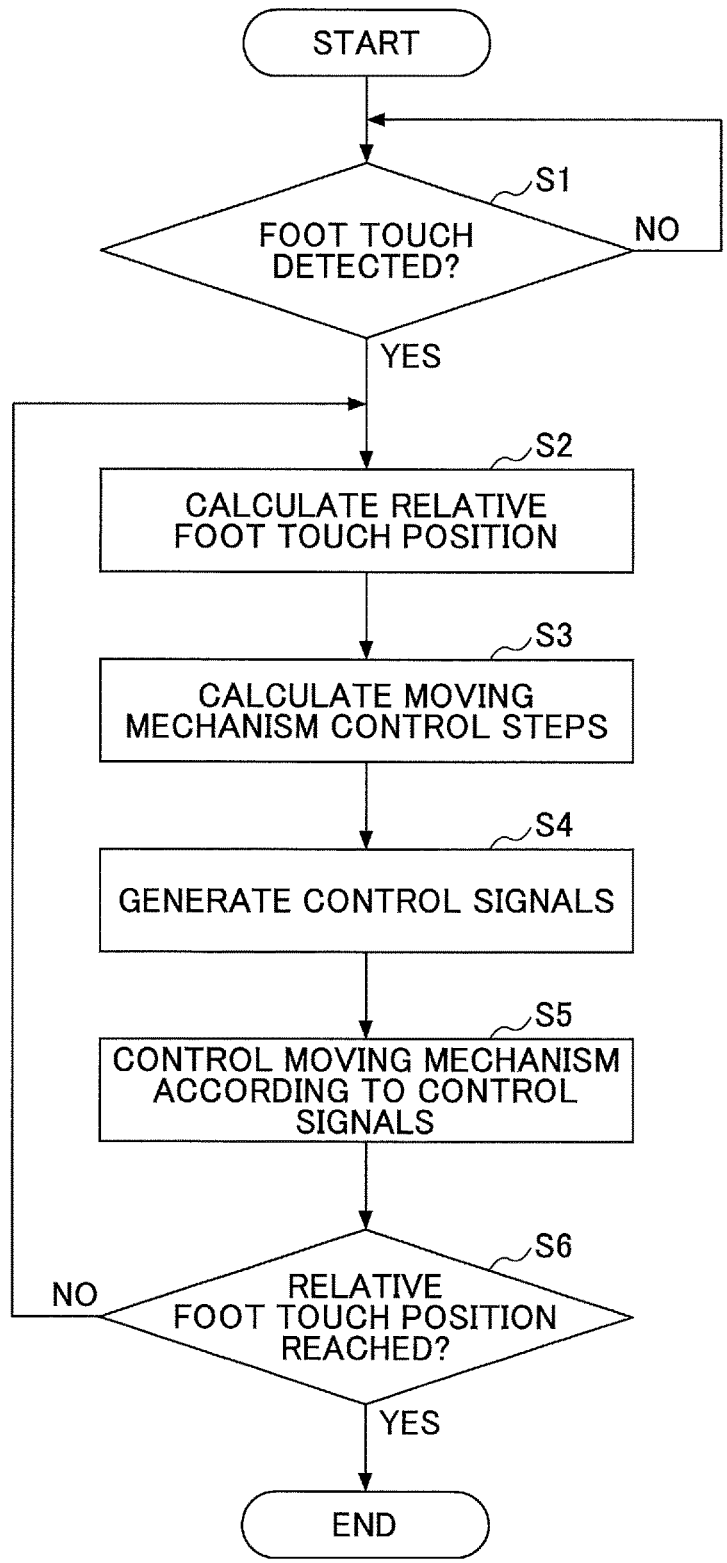
FIG. 4 is a flowchart illustrating one example of a flow of operations of the control unit 1.

FIG. 4 is a flowchart illustrating one example of a flow of operations of the control unit 1.

The flow of operations that will be described with reference to FIG. 4 can be implemented as a result of the CPU 11 executing the corresponding programs stored in the memory 12.

A process of FIG. 4 can be started, for example, subsequently after a previous process of FIG. 4 is finished.

Figure 6:
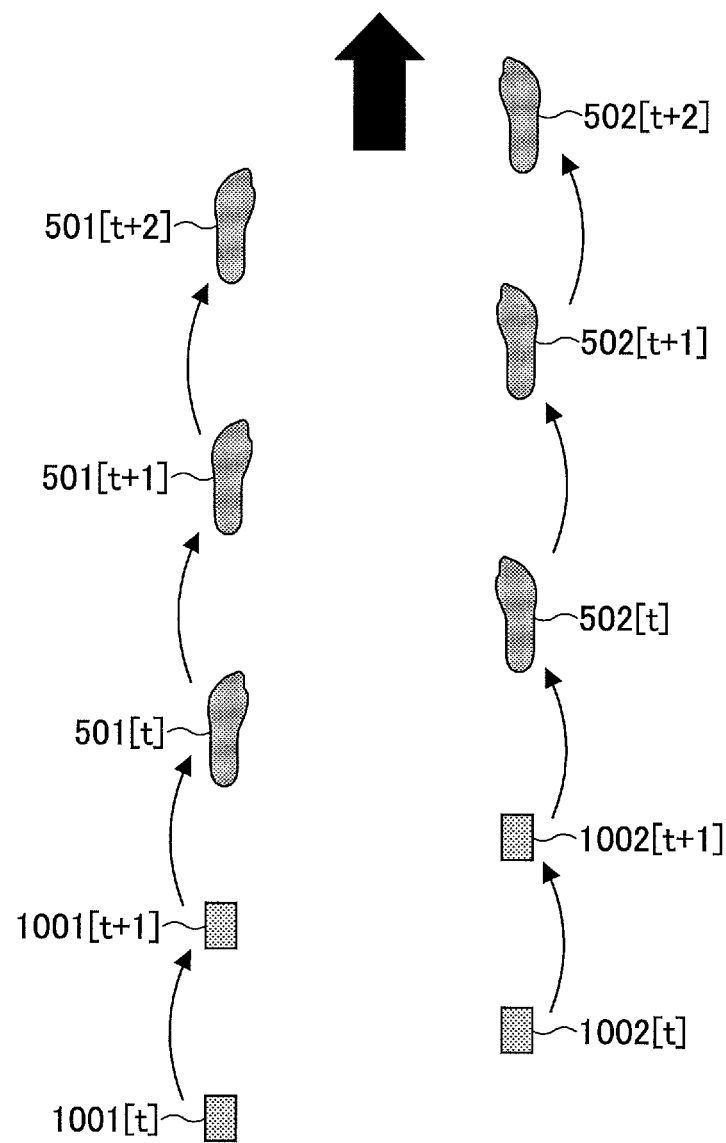
FIG. 6 illustrates one example of a manner of controlling the foot touch position following apparatus in association with foot touch positions according to the first embodiment of the present invention.

In particular, in the first embodiment of the present invention using the SRLs 1001 and 1002 shown in FIGS. 5A, 5B and 6, the process of FIG. 4 for placing one of the SRLs 1001 and 1002 at the corresponding foot touch position and the process of FIG. 4 for placing the other of the SRLs 1001 and 1002 at the corresponding foot touch position are carried out alternately, while the human 500 is walking with the feet 501 and 502 alternately.

Figure 8:
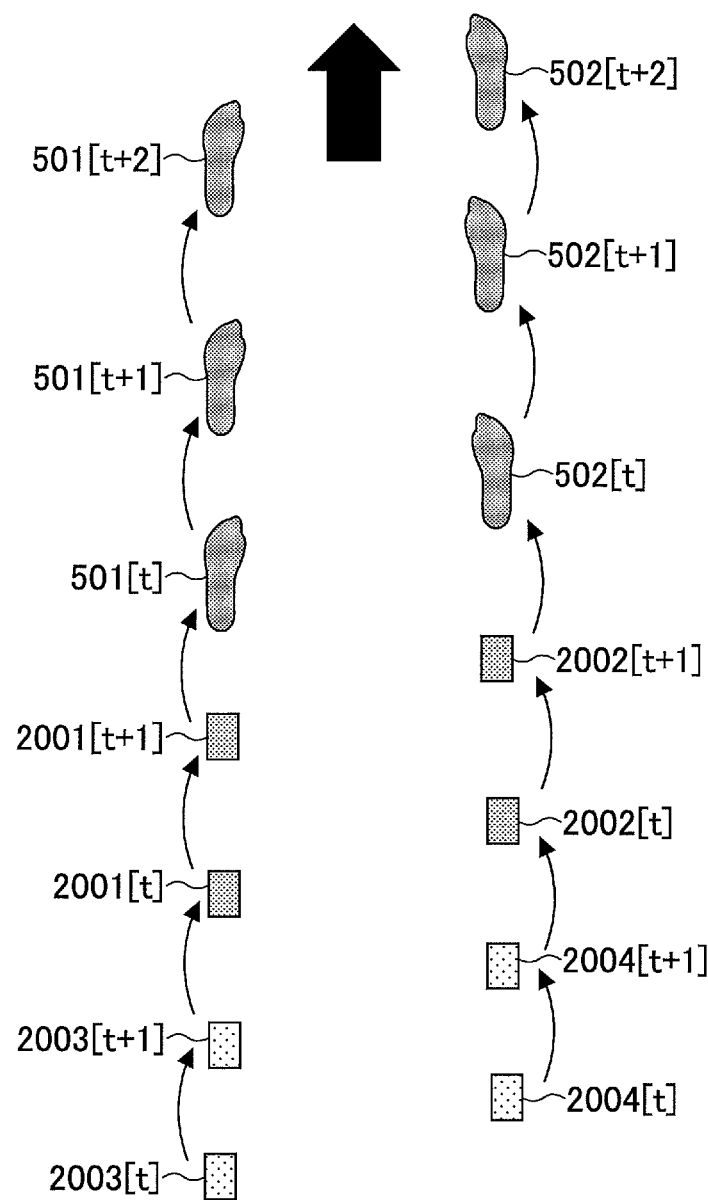
FIG. 8 illustrates one example of a manner of controlling the foot touch position following apparatus in association with foot touch positions according to the second embodiment of the present invention.

In particular, in the second embodiment of the present invention using the four legs 2001-2004 shown in FIGS. 7 and 8, the four legs 2001-2004 are to operate (in total four steps) in the same foot step cycle in which the human 500 walk with the feet 501 and 502 (in total two steps). Therefore, for example, the process of FIG. 4 for placing one of the anterior legs 2001 and 2002 at the corresponding foot touch position and the process of FIG. 4 for placing the other of the anterior legs 2001 and 2002 at the corresponding foot touch position are carried out alternately, while the human 500 walking with one of the feet 501 and 502. Then, the process of FIG. 4 for placing one of the posterior legs 2003 and 2004 at the corresponding foot touch position and the process of FIG. 4 for placing the other of the posterior legs 2003 and 2004 at the corresponding foot touch position are carried out alternately, while the human 500 walking with the other of the feet 501 and 502.

Therefore, according to the second embodiment of the present invention, in a process of FIG. 4 initiated when a touch of one of the feet 501 and 502 is detected in step S1, steps S2-S6 are carried out for placing one of the anterior legs 2001 and 2002 at the corresponding foot touch position, and thereafter, steps S2-S6 are carried out for placing the other of the anterior legs 2001 and 2002 at the corresponding foot touch position. Then, in a process of FIG. 4 initiated when a touch of the other of the feet 501 and 502 is detected in step S1, steps S2-S6 are carried out for placing one of the posterior legs 2003 and 2004 at the corresponding foot touch position, and thereafter, steps S2-S6 are carried out for placing the other of the posterior legs 2003 and 2004 at the corresponding foot touch position.

One "foot step cycle" includes a set of one step of one of the feet 501 and 502 and one step of the other performed successively, for example.

In step S1 of FIG. 4, the foot touch position detection part 111 determines whether the feet 501 and 502 of the target human 500 touch a surface such as the ground, a floor, or the like, based on image processing carried out on the images captured by the camera 2. For this purpose, the camera 2 can capture images of the feet 501 and 502 at a predetermined frame rate, and output thus captured successive frames of images to the control unit 1. The foot touch position detection part 111 receives the successive frames of images of the feet 501 and 502, and determines whether the feet 501 and 502 of the target human 500 touch the surface through image processing on the successive frames of images. For example, the foot touch position detection part 111 can determine that one of the feet 501 and 502 of the target human 500 touches the surface at a time point immediately before the Z-axis coordinate value of the corresponding foot starts increasing after it was decreasing.

If the foot touch position detection part 111 determines that the foot 501 or 502 of the target human 500 touches the surface (YES in step S1), step S2 is skipped in the first control period, and step S3 is carried out. In step S1, when the foot touch position detection part 111 determines that the foot 501 or 502 of the target human 500 touches the surface, the foot touch position detection part 111 detects the foot touch position of the corresponding foot at the same time.

In step S3, the moving mechanism control step calculation part 112 calculates the control steps for operating the SRLs 1001 and 1002 or the four legs 2001-2004 or the wheels 3001-3004, or the like, to place the corresponding leg or a tip of a 3006 of the base 3005 at the detected foot touch position or another position determined based thereon. In this regard, if the SRLs 1001 and 1002 or the four legs 2001-2004 follows the human 500 with the two-step length, as shown in FIGS. 6 and 8, the moving mechanism control step calculation part 112 calculates the control steps in step S3 for operating the SRLs 1001 and 1002 or the four legs 2001-2004 to place the corresponding leg at the foot touch position that was detected in the immediately previous foot step cycle.

According to the first embodiment of the present invention, the "corresponding leg" can be, for example, the SRL 1001 if a touch of the foot 501 is detected in step S1, and the SRL 1002 if a touch of the foot 502 is detected in step S1.

According to the second embodiment of the present invention, the four legs 2001-2004 are to operate (in total four steps) in the same foot step cycle in which the human 500 walk with the feet 501 and 502 (in total two steps). Therefore, the "corresponding leg" can be, for example, the anterior legs 2001 and 2002 in sequence in the stated order when a touch of the foot 501 is detected in step S1, and the posterior legs 2003 and 2004 in sequence in the stated order when a touch of the foot 502 is detected in step S1.

Steps S2-S6 are repeated every control period until when the determination result in step S6 becomes YES.

In the second control period or thereafter, the relative foot touch position calculation part 112 calculates the relative foot touch position calculated based on the movement of the base during the previous control period, in step S2. Then, the moving mechanism control step calculation part 112 calculates the control steps in step S3 for operating the SRLs 1001 and 1002 or the four legs 2001-2004, the wheels 3001-3004, or the like, to place the corresponding leg or the tip 3006 at the relative foot touch position or other position determined based thereon.

If the foot touch position detection part 111 determines that neither the foot 501 nor the foot 502 of the target human 500 touches the surface (NO in step S1), the foot touch position detection part 111 again carries out step S1 after the elapse of a predetermined interval.

In the second embodiment of the present invention using the four legs 2001-2004, in step S3, the moving mechanism control step calculation part 112 calculates the control steps for operating the four legs 2001-2004 to place the corresponding one of the anterior legs 2001 and 2002 at the detected foot touch position in the first control period, and place the corresponding one of the anterior legs 2001 and 2002 at the relative foot touch position in the second control period or thereafter, in the same way as the first embodiment of the present invention.

Also in the second embodiment of the present invention using the four legs 2001-2004, in step S3, the moving mechanism control step calculation part 112 calculates the control steps for operating the four legs 2001-2004 to place the corresponding one of the posterior legs 2003 and 2004 at the detected foot touch position in the first control period, and place the corresponding one of the posterior legs 2003 and 2004 at the relative foot touch position in the second control period or thereafter, in the same way. In this regard, if the anterior legs 2001 and 2002 follows the human 500 with the two-step length, and the posterior legs 2003 and 2004 follows the anterior legs 2001 and 2002 also with the two-step length, as shown in FIG. 8, the moving mechanism control step calculation part 112 calculates the control steps in step S3 for operating the four legs 2001-2004 to place the corresponding one of the posterior legs 2003 and 2004 at the foot touch position that was detected in the three-cycle previous foot step cycle. The "foot touch position that was detected in the three-cycle previous foot step cycle" is the same as the position where the corresponding one of the anterior legs 2001 and 2002 touches the surface in the immediately previous foot step cycle.

In step S4, the control signal generation part 114 generates the control signals based on the control steps generated in step S3.

In step S5, the control signal generation part 114 outputs the control signals generated in step S4 to the actuators of the moving mechanism 5 to operate the SRLs 1001 and 1002, the four legs 2001-2004, the wheels 3001-3005, or the like to place the corresponding leg or the tip 3006 at the detected foot touch position, the relative foot touch position, or the like.

In step S5, in the first embodiment of the present invention, the control signal generation part 114 controls the timing to output the control signals in such a manner that the force to press the human 500 generated as a result of the SRLs 1001 and 1002 being operated to place the corresponding one thereof at the detected foot touch position, the relative foot touch position, or the like can be constant. For this purpose, a force sensor, or the like, is mounted on the base 1005 which detects the pressure applied by the base 1005 to the body of the human 500 where the base 1005 is connected thereto.

In the second embodiment of the present invention, the control signal generation part 114 controls the timing to output the control signals in such a manner that, in each foot step cycle, the anterior legs 2001 and 2002 operate to reach the corresponding foot touch positions within the first half of the corresponding foot step cycle and the posterior legs 2003 and 2004 operate to reach the corresponding foot touch positions within the second half of the same foot step cycle. Thereby, the base 2005 can follow the human 500 at a constant distance.

In the third embodiment of the present invention, the control signal generation part 114 controls the timing to output the control signals in such a manner that the tip 3006 can follow the human 500 at a constant distance.

In step S6, the relative foot touch position calculation part 112 determines whether the corresponding one of the SRLs 1001 and 1002, the corresponding one of the four legs 2001-2004, the tip 3006, or the like, has reached the relative foot touch position. For example, the relative foot touch position calculation part 112 can determine whether the corresponding one of the SRLs 1001 and 1002, or the like, has reached the relative foot touch position based on the relative foot touch position, the current position of the base 1005/2005/3005 detected based on the output of the acceleration sensor 3, and the current states of the actuators of the moving mechanism 5 to determine the current position of the corresponding one of the SRLs 1001 and 1002, or the like. It is also possible that the SRLs 1001 and 1002 or the four legs 2001-2004 have touch sensors or the like to detect that they are landed, or for determining that the SRLs 1001 and 1002 or the four legs 2001-2004 have reached the corresponding relative foot touch positions, respectively.

If the relative foot touch position calculation part 112 determines that the corresponding one of the SRLs 1001 and 1002, or the like, has reached the relative foot touch position (YES in step S6), the process ends, according to the first or the third embodiment of the present invention. According to the second embodiment of the present invention, as described above, the anterior legs 2001 and 2002 or the posterior legs 2003 and 2004 are to reach the corresponding foot touch positions, one by one, in the same process of FIG. 4 initiated when a touch of one of the feet 501 and 502 is detected in step S1.

If the relative foot touch position calculation part 112 determines that the corresponding one of the SRLs 1001 and 1002, or the like, has not reached the relative foot touch position yet (NO in step S6), the process proceeds to step S2.

FIGS. 5A and 5B are perspective view illustrating one example of the foot touch position following apparatus 1000 according to the first embodiment of the present invention.

As shown in FIGS. 5A and 5B, the foot touch position following apparatus 1000 according to the first embodiment of the present invention has the base 1005 and the SRLs 1001 and 1002 connected to the base 1005, as mentioned above.

The base 1005 is connected with the body of the human 500 so that the foot touch position following apparatus 1000 moves together with the human 500. Thus, the foot touch position following apparatus 1000 can be called a "wearable robot", and can support and help the human 500 when the human carries a heavy load, for example.

FIG. 6 illustrates one example of a manner of controlling the foot touch position following apparatus 1000 in association with the foot touch positions of the human 500 according to the first embodiment of the present invention, described above with reference to FIGS. 1-4.

As shown in FIG. 6, the human 500 walks with the foot touch positions 501[$t$], 502[$t$], ..., 501[$t+2$] and 502[$t+2$], in sequence. In the same way, the foot step position following apparatus 1000 places the SRLs 1001 and 1002 at the positions 1001[$t$], 1002[$t$], 1001[$t+1$] and 1002[$t+1$], in sequence. In FIG. 6, "t", "t+1" and "t+2" denote the corresponding foot step cycles, which successively occur in the stated order.

As shown in FIG. 6, in the foot step cycle [$t$], the feet 501 and 502 come to have the foot step positions 501[$t$] and 502[$t$], respectively, while the SRLs 1001 and 1002 reach the positions 1001[$t$] and 1002[$t$], respectively.

Similarly, in the subsequent foot step cycle [$t+1$], the feet 501 and 502 come to have the foot step positions 501[$t+1$] and 502[$t+1$], respectively, while the SRLs 1001 and 1002 reach the positions 1001[$t+1$] and 1002[$t+1$], respectively.

In the yet subsequent foot step cycle [$t+2$], the feet 501 and 502 come to have the foot step positions 501[$t+2$] and 502[$t+2$], respectively, while the SRLs 1001 and 1002 reach the positions 501[$t$] and 502[$t$], respectively.

Thus, the SRLs 1001 and 1002 step on the foot step positions of the feet 501 and 502 of the human 500, in sequence, at a distance of a two-step length.

FIG. 7 is a perspective view illustrating one example of the foot touch position following apparatus 2000 according to the second embodiment of the present invention.

As shown in FIG. 7, the foot touch position following apparatus 2000 according to the second embodiment of the present invention has the base 2005 and the four legs 2001-2004 connected to the base 2005.

Different from the first embodiment of the present invention shown in FIGS. 5A and 5B, the base 2005 is not connected with the body of the human 500 so that the foot touch position following apparatus 2000 moves separately from the human 500.

FIG. 8 illustrates one example of a manner of controlling the foot touch position following apparatus 2000 in association with foot touch positions of the human 500 according to the second embodiment of the present invention, described above with reference to FIGS. 1-4.

As shown in FIG. 8, the human 500 walks with the foot touch positions 501[$t$], 502[$t$], ..., 501[$t+2$] and 502[$t+2$], in sequence. In the same way, the foot step position following apparatus 2000 places the anterior legs 2001 and 2002 at the positions 2001[$t$], 2002[$t$], 2001[$t+1$] and 2002[$t+1$], in sequence. The foot step position following apparatus 2000 places the posterior legs 2003 and 2004 at the positions 2003[$t$], 2004[$t$], 2003[$t+1$] and 2004[$t+1$], in sequence.

As shown in FIG. 8, in the foot step cycle [$t$], the feet 501 and 502 come to have the foot step positions 501[$t$] and 502[$t$], respectively, while the anterior legs 2001 and 2002 reach the positions 2001[$t$] and 2002[$t$], respectively, and the posterior legs 2003 and 2004 reach the positions 2003[$t$] and 2004[$t$], respectively.

Similarly, in the foot step cycle [$t+1$], the feet 501 and 502 come to have the foot step positions 501[$t+1$] and 502[$t+1$], respectively, while the anterior legs 2001 and 2002 reach the positions 2001[$t+1$] and 2002[$t+1$], respectively, and the posterior legs 2003 and 2004 reach the positions 2003[$t+1$] and 2004[$t+1$], respectively.

In the yet subsequent foot step cycle [$t+2$], the feet 501 and 502 come to have the foot step positions 501[$t+2$] and 502[$t+2$], respectively, while the anterior legs 2001 and 2002 reach the positions 501[$t$] and 502[$t$], respectively, and the posterior legs 2003 and 2004 reach the positions 2001[$t$] and 2002[$t$], respectively.

Thus, the anterior legs 2001 and 2002 step on the foot step positions of the feet 501 and 502 of the human 500, in sequence, at a distance of a two-step length. The posterior legs 2003 and 2004 step on the previously landed positions of the anterior legs 2001 and 2002, in sequence, at a distance of a two-step length. In other words, the posterior legs 2003 and 2004 ultimately step on the foot step positions of the feet 501 and 502 of the human 500, in sequence, at a distance of four steps.

The second embodiment of the present invention has been described assuming that the number of legs is four. However, embodiments of the present invention are not limited thereto. The number of legs can be changed to two, six, eight, or the like in embodiments of the present invention. For example, embodiments of the present invention each of which has two legs include humanoids (that can be also called humanoid robots, biped robots, two-legged robots, or the like). The necessary control scheme for each of these embodiments is similar to that in the case of the four legs 2001-2004 described above.

In the same way, the number of legs of the SRLs according to the first embodiment of the present invention described above with reference to FIGS. 5A, 5B and 6 can be increased to four, six, eight, or the like. The necessary control scheme is similar to the case of the four legs 2001-2004 of the second embodiment of the present invention described above.

FIGS. 9 and 10 illustrate one example of a method of detecting foot touch positions according to the first embodiment of the present invention.

As shown in FIGS. 9 and 10, the camera 2 is mounted on the base 1005 of the foot touch position following apparatus 1000 according to the first embodiment of the present invention.

As described above, the camera 2 captures images of the feet 501 and 502, which are processed by the control unit 1 so that the positions of the feet 501 and 502 with respect to the camera 2, i.e., with respect to the base 1005, can be determined.

FIG. 11 illustrates one example of a method of detecting foot touch positions according to the second embodiment of the present invention.

As shown in FIG. 11, the camera 2 is mounted on the base 2005 of the foot touch position following apparatus 2000 according to the second embodiment of the present invention.

As described above, the camera 2 captures images of the feet 501 and 502, which are processed by the control unit 1 so that the positions of the feet 501 and 502 with respect to the camera 2, i.e., with respect to the base 2005, can be determined.

Figure 12:
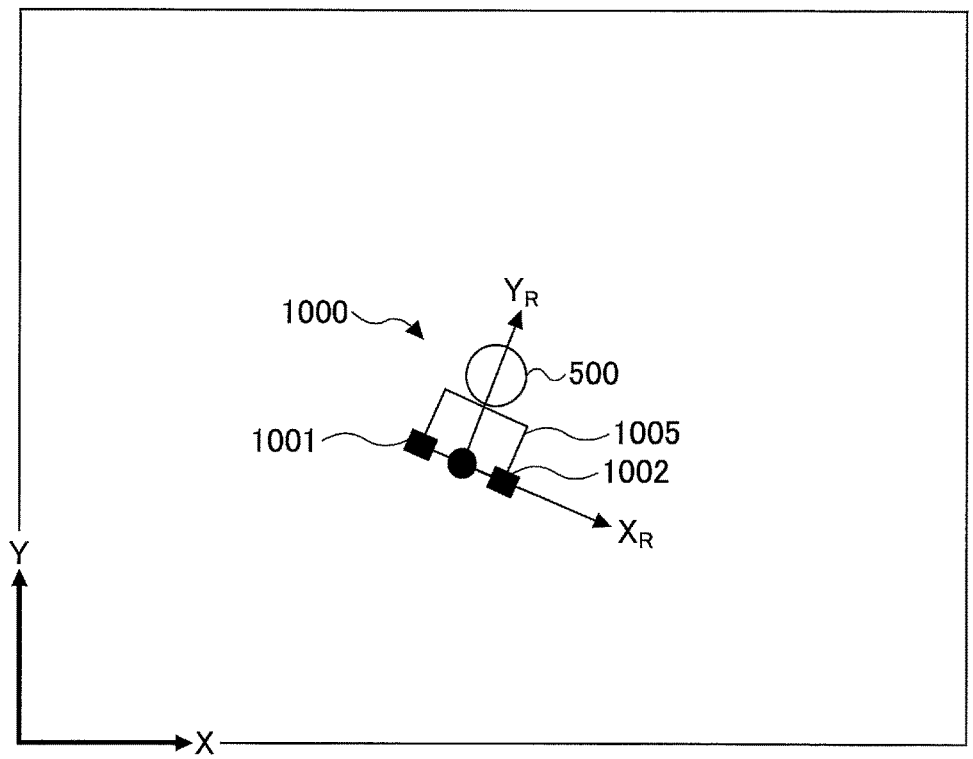
FIG. 12 illustrates one example of a method of storing foot touch positions.

FIG. 12 illustrates one example of a manner of storing foot touch positions.

In this regard, the description has been made above assuming that the foot touch positions are detected as the positions with respect to the camera 2, i.e., with respect to the base 1005/2005/3005. However, embodiments of the present invention are not limited thereto, and it is also possible to detect the foot touch positions as positions with respect to a fixed point in a factory, for example, to be used as a three-dimensional coordinate origin. Thereby, a foot touch position following apparatus such as that 2000 according to the second embodiment of the present invention, for example, can operate solely or independently from the human 500, to reach the foot touch positions of the human 500, data of which is stored in the memory 12 of the control unit 1.

After the foot touch positions of the human 500 occurring while the human 500 is walking are detected and stored as mentioned above, steps S2-S6 of FIG. 4 can be carried out for each of the stored foot touch positions, in sequence. In this regard, as a result of carrying out coordinate system conversion from the coordinate system with respect to the above-mentioned fixed point in the factory to the coordinate system with respect to the base 2005 on the stored foot touch positions, the same control scheme as that described above with reference to FIG. 4 can be used to control the foot touch position following apparatus 2000 also in such a case where the foot touch position following apparatus 2000 operates solely or independently from the human 500.

In order to carry out the above-mentioned coordinate system conversion, it is necessary to determine the position of the base 2005 in the coordinate system with respect to the above-mentioned fixed point in the factory. For this purpose, technology "self-position estimation" can be used. The "self-position estimation" technology is discussed in, for example, "Positioning Estimation Method for Wheeled Mobile Robot by Integrating Laser Navigation and Dead Reckoning Systems", JRSJ Vol. 11, No. 7, pages 1028-1038, 1993, written by Masafumi Hashimoto, Fuminori Oba, Yasushi Fujikawa, Kazutoshi Imamaki and Tetsuo Nishida; and "Robust Positioning Method Using Omni-directional Camera and Dead Reckoning for Soccer Robots", JRSJ Vol. 22, No. 3, pages 343-352, 2004, written by Ryo Kurazume, Akira Motomura, Yuuki Yamguchi, Takeshi Matsuoka, Motoji Yamamoto and Tsutomu Hasegawa, for example. Other than these examples, various ways can be used in the "self-position estimation" technology. For example, an odometry technique, a method using a camera, a method using a lidar, a Simultaneous Localization and Mapping (SLAM) technique, a method using a Radio Frequency Identification (RFID) tag, and so forth, can be used for this purpose.

FIG. 13 illustrates one example of a manner of controlling a route of the foot touch position following apparatus 3000 in association with foot touch positions according to the third embodiment of the present invention.

As shown in FIG. 13, the foot touch position following apparatus 3000 has a form like a vehicle having wheels 3001-3004, for example.

In one example, the control unit 1 of the foot touch position following apparatus 3000 controls the moving mechanism 5 that includes the actuators (i.e., electric motors or so driving to rotate the wheels 3001-3004, for example) in such a manner as to cause the tip 3006 of the base 3005 to pass through the foot touch positions 501[$t$], 501[$t$+1], 501[$t$+2], . . . , of the left foot 501 of the human 500, to be used as way points.

In another example, the control unit 1 of the foot touch position following apparatus 3000 controls the moving mechanism 5 in such a manner as to cause the tip 3006 of the base 3005 to pass through other way points 601[$t$], 601[$t$+1], 601[$t$+2], . . . , that are the midpoint between the foot touch positions 501[$t$] and 502[$t$], the midpoint between the foot touch positions 501[$t$+1] and 502[$t$+1], the midpoint between the foot touch positions 501[$t$+2] and 502[$t$+2], . . . . Because the human 500 naturally steps on the safe positions/areas during walking as mentioned above, this example of using the midpoints of the foot touch points can be advantageous from the traveling safety viewpoint while the control scheme may be somewhat complicated for calculating the midpoints from the detected foot touch points in comparison to the above-described case of using the foot touch positions as way points as they are.

In the third embodiment of the present invention, in order to determine an actual route 5001 or 6001 through which the foot touch point following apparatus 3000 will pass, from the way points 501[$t$], 501[$t$+1], 501[$t$+2], . . . , or 600[$t$], 600[$t$+1], 600[$t$+2], . . . , as described above, "spline interpolation" technology, or the like, can advantageously be used. The relative foot touch position calculation part 112 and the moving mechanism control step calculation 113, described above with reference to FIG. 3, are one example of a wheel route determination part to determine, from the way points, the route 5001 or 6001 through which the foot touch point following apparatus 3000 will pass.

The foot touch position following apparatus 3000 according to the third embodiment of the present invention described above with reference to FIG. 13 is advantageous in that, because it uses the wheels 3001-3004, the stability is high in comparison to a legged locomotion robot, so that it can go through various rough roads without falling or rollover more easily. Also, the necessary control scheme can be simplified in comparison to a legged locomotion robot. As a result, the apparatus configuration can also be simplified, the apparatus size can be miniaturized, and the necessary cost can be reduced.

In the foot touch position following apparatus 3000, the wheels 3001-3004 can be replaced with caterpillars so that the foot touch position following apparatus can have a form of a crawler tractor, a crawler robot, or the like. The necessary control scheme can be the same as that of the third embodiment of the present invention using the wheels 3001-3004 described above.

FIG. 14 illustrates one example of a method of detecting foot touch positions.

As shown in FIG. 14, it is also possible to acquire foot touch positions using a drone 700 flying over the human 500, for example, to capture images of the feet 501 and 502, and detecting the foot touch positions 502[*t*], 502[*t*+1], 502[*t*+2], . . . , which will be used to control, for example, the foot touch position following apparatus 2000 to cause it to solely or independently operate to reach the detected the foot touch positions, in sequence.

The foot position following apparatuses 1000/2000/3000 described above can be used for carrying loads on the bases 1005/2005/3005, assisting the human 500 in walking, or the like, while reaching a sequence of the foot touch points, one by one. The foot position following apparatuses 1000/2000/3000 can also be used for automatically carrying out predetermined tasks at destinations where the foot position following apparatuses 1000/2000/3000 have reached through the successive operations of reaching the sequence of foot touch points, one by one. The tasks can include a machining process, a welding process, an assembling process, a load lifting process, and so forth.

The present application is based on and claims the benefit of priority of U.S. Provisional Application No. 62/151,051, filed on Apr. 22, 2015, the entire contents of which are hereby incorporated herein by reference.

REFERENCE SIGNS LIST 1 control unit
2 camera
3 acceleration sensor
5 moving mechanism
111 foot touch position detection part
112 relative foot touch position calculation part
113 moving mechanism control step calculation part
114 control signal generation part
1000, 2000, 3000 foot touch position following apparatuses

The invention claimed is:

1. A foot touch position following apparatus that is configured to follow a human, comprising:
   a foot touch position detection part attached to the foot touch position following apparatus and configured to detect a position of a surface where a human foot touches in a three-dimensional coordinate system having an origin of coordinate axes X, Y and Z as a position of the foot touch position detection part while the human is moving by foot, and
   a moving part configured to move the foot touch position following apparatus together with the foot touch position detection part so as to follow the human that is moving by foot based on a detected result of the foot touch position detection part by placing legs of the moving part at positions same as the position of the surface where the human foot touches in the three-dimensional coordinate system and three-dimensionally moving the foot touch position following apparatus.

2. The foot touch position following apparatus as claimed in claim 1, further comprising:
   a leg part configured to support a base of the foot touch position following apparatus,
   wherein the moving part is configured to place the leg part at the position where the human foot touched the surface detected by the foot touch position detection part.

3. The foot touch position following apparatus as claimed in claim 1, further comprising:
   a wheel configured to support a base of the foot touch position following apparatus; and
   a wheel route determination part configured to determine a route, through which the wheel is to pass, based on the positions where the human feet touched the surface detected by the foot touch position detection part,
   wherein
   the moving part is configured to cause the wheel to pass through the route determined by the wheel route determination part.

4. The foot touch position following apparatus as claimed in claim 3, wherein
   the wheel route determination part is configured to determine the route, through which the wheel is to pass, to be a route that passes through the positions where the human feet touched the surface detected by the foot touch position detection part.

5. The foot touch position following apparatus as claimed in claim 3, wherein
   the wheel route determination part is configured to determine the route, through which the wheel is to pass, to be a route that passes through a line that passes between the positions where the human feet touched the surface detected by the foot touch position detection part.

6. The foot touch position following apparatus as claimed in claim 1, further comprising:
   a driving part configured to drive the moving part to move the foot touch position following apparatus based on the detected result of the foot touch position detection part.

7. The foot touch position following apparatus as claimed in claim 1, wherein
   the foot touch position following apparatus is further configured to carry out a task while the foot touch position following apparatus is moving based on the detected result of the foot touch position detection part.

8. The foot touch position following apparatus as claimed in claim 1, wherein
   the foot touch position following apparatus is further configured to carry out a task after the foot touch position following apparatus reaches a destination as a result of moving based on the detected result of the foot touch position detection part.

9. A method of controlling a foot touch position following apparatus configured to follow a human and including:
   at least one processor and
   a foot touch position detection part provided to the foot touch position following apparatus,
   the method comprising:
   detecting a position of a surface where a human foot touches in a three-dimensional coordinate system having an origin of coordinate axes X, Y and Z as a position of the foot touch position detection art while the human is moving by foot; and
   moving the foot touch position following apparatus together with the foot touch position detection part so as to follow the human that is moving by foot based on a detected result of the detecting by placing leis of the moving part at positions same as the position of the surface where the human foot touches in the three-dimensional coordinate system and three-dimensionally moving the foot touch position following apparatus.

10. The method as claimed in claim 9, further comprising:
placing a leg part of the foot touch position following apparatus at the position where the human foot touched the surface detected by the detecting.

11. The method as claimed in claim 9, further comprising:
determining a route, through which a wheel of the foot touch position following apparatus is to pass, based on positions where human feet touched the surface detected by the detecting,
wherein
the wheel is configured to move the foot touch position following apparatus by passing through the route.

12. The method as claimed in claim 11, further comprising:
determining the route, through which the wheel is to pass, to be a route that passes through the positions where the human feet touched the surface detected by the detecting.

13. The method as claimed in claim 11, further comprising:
determining the route, through which the wheel is to pass, to be a route that passes through a line that passes between the positions where the human feet touch the surface detected by the detecting.

14. The method as claimed in claim 9, wherein
the foot touch position following apparatus is further configured to carry out a task while the foot touch position following apparatus is moving based on the detected result of the detecting.

15. The method as claimed in claim 9, wherein
the foot touch position following apparatus is configured to carry out a task after the foot touch position following apparatus reaches a destination as a result of moving based on the detected result of the detecting.

16. A non-transitory computer-readable information recording medium storing therein a computer-executable program, the computer-executable program causing a computer, when executed by the computer, to carry out a method for controlling a foot touch position following apparatus configured to follow a human and including:
a foot touch position detection part provided to the foot touch position following apparatus,
the method comprising:
detecting a position of a surface where a human foot touches in a three-dimensional coordinate system having an origin of coordinate axes X, Y and Z as a position of the foot touch position detection part while the human is moving by foot; and
moving the foot touch position following apparatus together with the foot touch position detection part so as to follow the human that is moving by foot based on a detected result of the detecting by placing legs of the moving part at positions same as the position of the surface where the human foot touches in the three-dimensional coordinate system and three-dimensionally moving the foot touch position following apparatus.

17. The foot touch position following apparatus as claimed in claim 1, wherein the foot touch position detection part is configured to detect the position by detecting a marker attached to the human foot.

18. The foot touch position following apparatus as claimed in claim 17, wherein the marker includes a light emitting diode.

19. The foot touch position following apparatus as claimed in claim 1, further comprises:
a base on which the foot touch position detection part is mounted,
an acceleration sensor configured to detect an acceleration of the base, and
a relative foot touch position calculation part configured to calculate a relative foot touch position based on the detected position of the surface and a movement of the base calculated based on the acceleration of the base measured by the acceleration sensor.

* * * * *